FIG. 1

INVENTOR.
ARTHUR W. GRUBER
BY Leslie C. Byer
ATTORNEY

Feb. 4, 1964 A. W. GRUBER 3,120,142
CUTTING WHEEL FEED CONTROL
Filed Dec. 20, 1961 6 Sheets-Sheet 3

FIG. 3

INVENTOR
ARTHUR W. GRUBER
BY
Leslie C. Byer
ATTORNEY

FIG. 6

United States Patent Office 3,120,142
Patented Feb. 4, 1964

3,120,142
CUTTING WHEEL FEED CONTROL
Arthur W. Gruber, Metuchen, N.J., assignor to Air Reduction Company, Incorporated, New York, N.Y., a corporation of New York
Filed Dec. 20, 1961, Ser. No. 160,745
13 Claims. (Cl. 83—54)

My invention relates to methods and apparatus for controlling the starting point and stopping point of cuts made in succession in a number of substantially identical workpieces despite decreases in the diameter of the cutting wheel due to wear occasioned by its use.

If like workpieces and a cutting wheel are moved between two predetermined positions relatively to one another, which determine the length of the cut the exact end location of a cut formed in each workpiece will depend on the diameter of the cutting wheel and the distance it is fed into the workpiece. As the cutting wheel is consumed due to wear its diameter decreases and its cutting arc must be increased by feeding it toward the workpiece a greater distance than its decrease in radius when measured along its center line of movement into the workpiece, if the end location of cuts in successive workpieces are to be maintained the same. The end locations of these cuts will be maintained constant in successive workpieces if the chord subtending the cutting arc of the cutting wheel is maintained constant by feeding the cutting wheel along its center line of movement by an amount which will accomplish this result.

There are many instances where the beginning and the end of a cut formed in workpieces by a cutting wheel must be started and stopped at precise locations on the workpieces. One such application is a method of welding girth joints in pipe lines where the cutting wheel is employed to form a substantially uniform narrow gap between the end portions of pipe ends which have been brought into closer proximity than this desired gap width and where this sizing operation must be started and stopped at precise locations relative to the position of a welding agency so that the curvature of the cutting wheel allows the end or ends of a weld to be tapered to promote excellent weld quality where they overlap one another. The curvature of the cut formed by the cutting wheel facilitates good quality in the weld at the overlap by eliminating craters, flaws, and voids at the weld junctions. Means are provided for acurately positioning the cutting wheel assembly and the welding agency relative to locations on the workpiece where the cutting and welding operations are to begin and end but unless compensation is made for the decrease in size of the cutting wheel with wear, the accuracy of this adjustment is nullified.

Apparatus suitable for this pipe welding operation may comprise a frame for mounting the cutting wheel and an arc welding apparatus in selective operative and inoperative positions relative to the ends of pipe sections on which the frame is mounted and means for positioning the cutting wheel and arc welding apparatus relative to the joint between the pipe sections so that the end of a weld is cut to form ramps for starting and ending welds. The cutting and welding operations may be performed in two stages each beginning at the top of the joint and continuing to the bottom thereof on opposite sides of the pipe assembly. The gap formed may have any desired depth to width ratio and the weld is formed by feeding a consumable electrode into the gap so that arcing occurs in the gap to form a weld having a desired depth to width ratio. The operation is preferably performed in a carbon dioxide atmosphere although other atmospheres can be employed. During welding metal flows under the arc to the root section of the weld and behind the arc to the face section thereof to melt the upper and lower corners of the prepared gap and thereby produce consistent root fusion and small weld reinforcement. The thus formed narow fast cooling weld prevents molten metal from flowing out of the joint in the vertical and overhead positions of welding.

It is an object of my invention to position a succession of workpieces in a predetermined position relative to the center line of travel of a cutting wheel toward said workpieces and control the in feed of said cutting wheel along its center line of travel by an amount depending on the size of the cutting wheel so that the ends of cuts on successive workpieces ocur at the same location thereon.

More specifically it is an object of my invention to provide a gauge mechanism which can be brought into engagement with a cutting wheel in its retracted position to predetermine the operation of a positioning means by which it is fed into a cutting position in which it will make in a succeeding workpiece a cut which terminates at the same desired location therein as in a previously cut workpiece irrespective of its wear in making this previous cut.

It is also an object of my invention to provide a cutting wheel assembly in a pipe welding machine which will cut a gap between an assembly of pipe sections to square and properly space the pipe ends for a welding operation and which will initiate the cut forming said gap at a predetermined position at the pipe ends relative to which a welding agency is positioned for initiating the weld and for closing it onto itself or a previously formed weld.

It is also an object of my invention to provide an operating procedure whereby the end location of cuts in workpieces are maintained constant by controlling the distance a cutting wheel is fed into each succeeding workpart in dependence on the reduced size of the cutting wheel due to its wear in making a previous cut.

Further objects of my invention will become apparent from the following description thereof relative to its use in preparing pipe ends for the above described welding operation.

In accordance with the embodiment of my invention illustrated in the accompanying drawings means are provided for rotating a cutting wheel in a support therefor by which it is fed along a path of travel toward a workpiece which is held in a fixed position relative to the cutting wheel support. The cutting wheel is fed from a retracted position in which its cutting wheel clears the workpiece and means movable along a path of travel parallel to the path of travel of the cutting wheel support is employed for gauging the size of the cutting wheel when it is in its retracted position at a point on its periphery which is aligned relative to the path of travel of the cutting wheel support with the point on the workpiece where it is intended that the cutting wheel intersect the workpiece to initiate a cut therein. Means controlled by the measurement thus obtained is employed for determining the distance the cutting wheel support is fed from its retracted position to its cutting position.

More specifically a gauge bar is mounted on the cutting wheel support for lengthwise adjustment relative thereto along a line parallel to the path of travel of the cutting wheel support in accordance with the engagement of an offset part thereof which is movable into engagement with the periphery of the cutting wheel where it is intended that it intersect the workpiece when in its cutting position. The offset part of the gauge bar is biased to a retracted position where it will not interfere with a cutting operation and is extensible and rotatable from its biased position to an operative position for engaging the periphery of the cutting wheel when making this measurement which depends on the size of the cutting wheel. The gauge bar is clamped in its adjusted position on the cutting wheel support for movement therewith and is provided with limit switch operating cams or dogs which control the feed of the cutting wheel support toward the workpiece and the extent of its subsequent retraction therefrom after the cutting operation has been performed.

A more complete description of this embodiment of my invention will now be described with reference to the illustration thereof shown in the accompanying drawings.

The pipe welding machine shown in the drawings comprises a stationary frame in which the pipe ends are clamped with their ends in closer proximity than the final gap width desired for the welding operation and in which a second frame is mounted for rotation about the longitudinal axis of the pipe assembly for traversing a gap cutting means and a welding means along the joint between the pipe ends. The gap cutting means is a cutting wheel assembly controlled in accordance with my invention and the welding means is a consumable electrode gas shielded arc welding head. Preferably the gap cutting means forms at the joint between the pipe sections a gap opening of uniform width from substantially the top to substantially the bottom of the joint on one side of the pipe assembly, and this gap is then welded by the welding means feeding a consumable electrode into this gap to form a weld through substantially the length of this gap. Thereafter the cutting means is employed for forming on the other side of the pipe assembly an extension of the original gap to complete the circumferential gap formation at the joint and this gap extension is then welded to complete the girth weld by which the pipe ends are integrally united with one another. Prior to their traversing movement along the pipe joint, the gap cutting means and the welding means are positioned relative thereto in predetermined positions by a suitable control means and it is consequently necessary to have the gap cutting means initiate and end the prepared gaps at the said predetermined positions at which the welding operations are initiated and ended. When the gap cutting means comprises a cutting wheel and its drive means, compensation is provided for consumption of the cutting wheel due to wear by controlling its in feed along its center line of travel to its cutting position by an amount depending on the size of the cutting wheel so that the ends of cuts on successive pipe joints occur at the same location thereon. In this way curved ramps are formed at the ends of the prepared gaps which insure the formations of welds of the desired quality and welds of uniform quality where their ends overlap one another.

Figure 1:
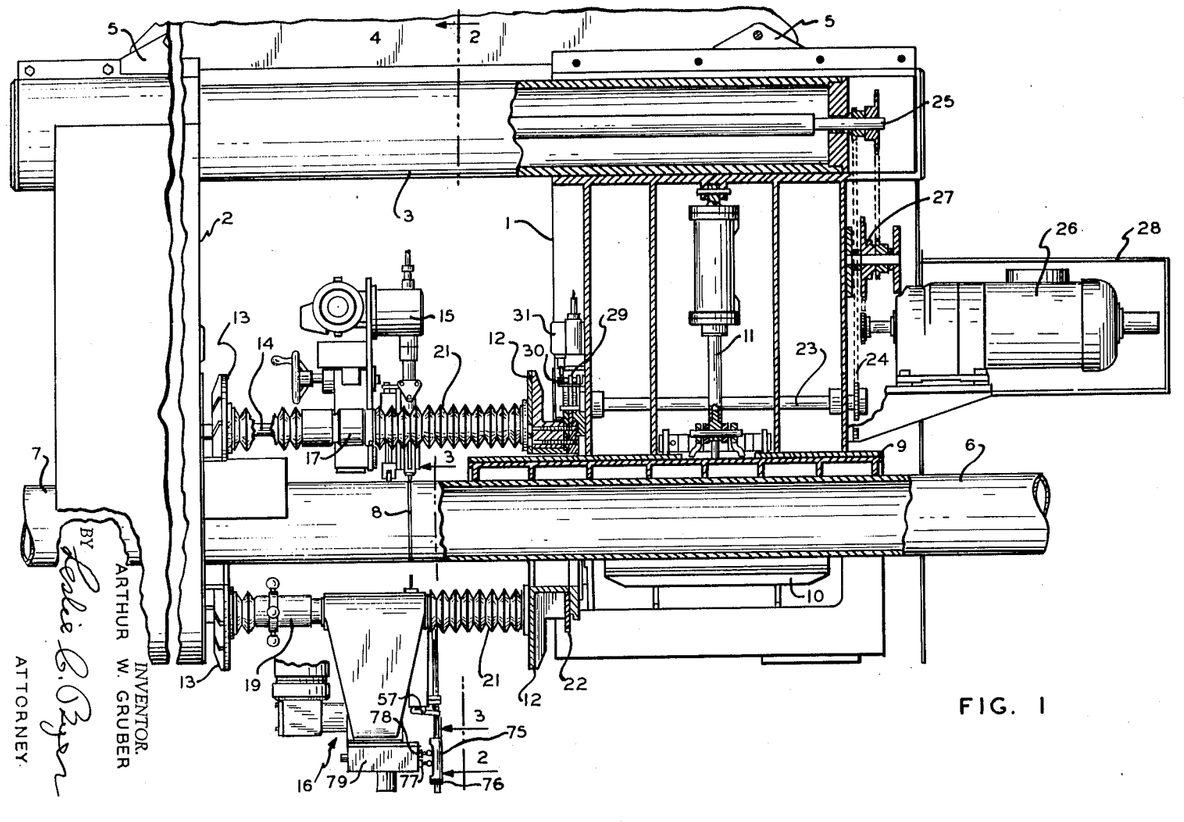
FIG. 1 is a side view of a pipe welding machine which embodies my invention and in which parts have been shown in section to illustrate their construction and organization in the machine.
Figure 2:
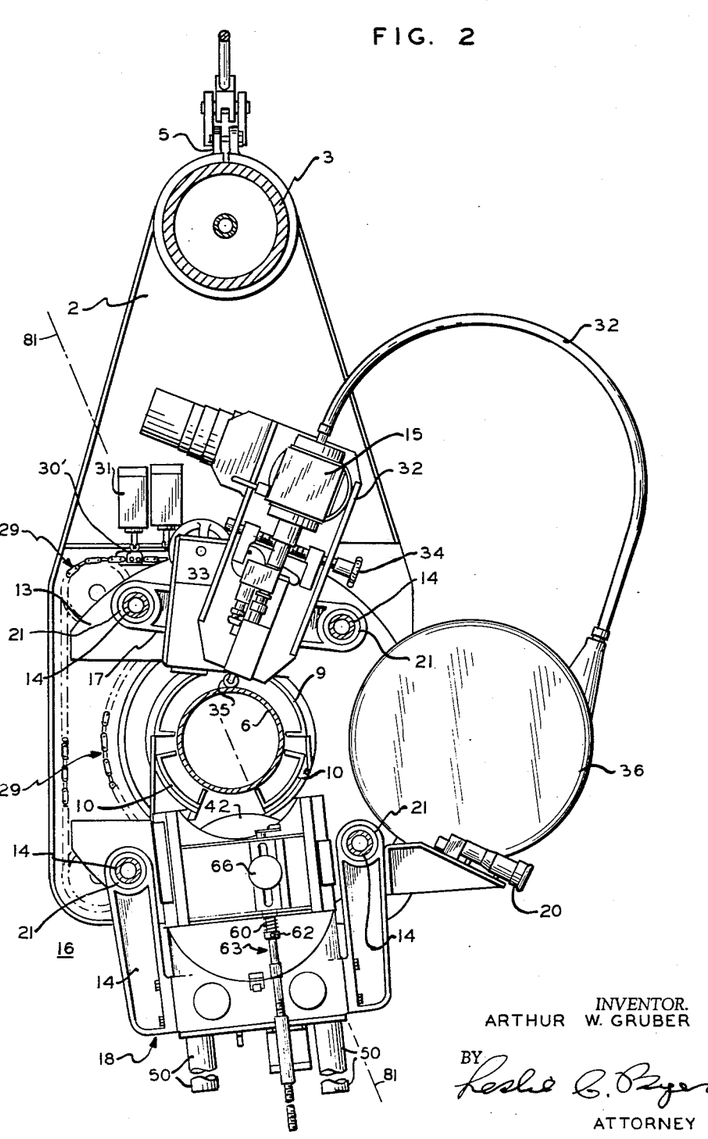
FIG. 2 is an end view of the parts of this machine as viewed to the left of section line 2—2 of FIG. 1.

As shown in FIGS. 1 and 2 of the drawings, the stationary frame of the pipe welder comprises end housings 1 and 2 joined by a cylindrical member 3 to form a rigid structure which can be bodily lifted by a hoisting machine having a hook or like means engaging a bar 4 which is partly shown in FIG. 1 and has ends bolted to lugs 5 attached to the top portion of members 1 and 2.

The end housings 1 and 2 have transverse open lower ends for the reception of the end portions of pipes 6 and 7 and enclose pneumatically operated clamps which engage and hold these end portions with the pipe ends in closely abutting relation to form a joint 8 which is located in the space between the end housings. Each clamp comprises a semi-circular abutment 9 forming part of the housing structure and having a seat of the same curvature as that of the surface of the pipe against which it is held by two jaws 10 having pipe engaging surfaces of the same curvature as the pipe. These jaws are pivoted in the housing on levers forming part of a toggle mechanism by which they are brought into and out of engagement with the pipe by a pneumatic mechanism 11 comprising a cylinder and piston rod acting through toggle links on the ends of the pivoted levers which are opposite their ends on which the jaws 10 are mounted.

A rotating frame comprising face plates 12 and 13 connected by four rods or shafts 14 provides in the space between the end housings 1 and 2 of the machine a support for the welding head 15 and the gap cutting means 16. The welding head is mounted on a member 17 which is supported for sliding movement lengthwise of two of the shafts 14 and the gap cutting means is mounted on a member 18 for sliding movement lengthwise of the other two shafts 14. End housings 1 and 2 are provided with legs (not shown) which elevate them from the surface on which the machine is supported to provide clearance for the free rotation of the welding head and gap cutting means around the pipe joint upon rotation of their supporting frame.

The welding head and gap cutting means are aligned with each other and the joint 8 between the pipe ends. This may be accomplished by independent adjustments of the welding head and gap cutting means on shafts 14 or an automatic means may be provided so that the welding head is automatically aligned with an adjustment of the gap cutting means. This automatic means may comprise a hydraulic synchronizer comprising pistons located in hollow shafts 14 for moving one support member 17 or 18 in dependence on movement of the other along its shafts 14 by fluid pressure transmitted through conduits making end connections between shafts 14. In this latter case the gap cutting means may be adjusted relative to the pipe joint 8 by operating a hollow screw member 19 to displace it along its support shafts 14 to a position determined by a telescopic sight 20. As shown in FIG. 1 the shafts 14 are protected by bellows members 21 which extend between the face plates 12 and 13 and the members 17 and 18 on which the welding head 15 and gap cutting means 16 are supported.

The face plates 12 and 13 are provided with hubs which are rotatably supported in bearings in housings 1 and 2 for rotation about the common longitudinal axis of the pipes 6 and 7. They are C-shaped as are their bearings so that when their open portions coincide, which occurs when these open portions are facing down, the machine may be lifted upwardly away from the pipe line sections formed by the welded union between pipes 6 and 7 after the clamps in housings 1 and 2 have been opened.

Each face plate is provided with a C-shaped sprocket which in position coincides therewith and by which it is rotated by lengthwise movement of a chain which engages the teeth of the sprocket. This drive chain is of double width and also passes over a drive sprocket and two or more supporting sprockets so that it does not encircle the pipe assembly at the openings in the face plates and their sprockets. One width of the chain has its periphery in driving engagement with the C-shaped sprocket segment over a portion of the periphery of said segment which is greater in extent than the open portion thereof and means operative when the chain is opposite the open portion of the C-shaped sprocket is provided for supporting the periphery of the other width of the chain in a circular arc configuration concentric with and at an equal radius with the C-shaped sprocket segment so that the chain as a whole is supported by the chain supporting means whenever the driving length of the chain is opposite the open portion of the C-shaped sprocket segment. A detailed description of this chain drive is given in United States Letters Patent 2,979,598 John Laslo patented April 11, 1961. By thus preventing sagging of the drive chain when it is passing over the open portion of the C-shaped sprocket segment, a uniform rotation is imparted to it and to the face plate driven thereby assuming of course that the chain is traveling at a uniform speed.

The drive sprocket for face plate 12 is shown at 22 in FIG. 1 and the chain 29 by which it is rotated is driven by a sprocket at one end of the shaft 23 which passes through housing 1 and which is rotated by a chain and sprocket drive 24 on one side of this housing by rotation of a shaft 25 which extends through cylindrical member 3 and is journaled in bearings supported in the ends thereof. A chain drive at the other end of shaft 25 imparts rotation to a C-shaped sprocket by which face plate 13 is rotated in synchronism with face plate 12. Rotation is imparted to shaft 25 by a motor 26 whose shaft is connected thereto through a chain and sprocket drive 27. The motor 26 is mounted on a bracket attached to housing 1 and is provided with an enclosure 28.

As shown in FIG. 1 the drive chain for sprocket 22 has a return path along a horizontal chain guide 30 which positions cam like members 30' of the chain relative to rollers of control switches 31 which form part of a control system for positioning and operating the welding head 15 and the gap cutting means 16. This control positions the gap cutting means at a predetermined location over the pipe joint, feeds it from a retracted position to a cutting position where the amount of its in feed is determined by means described below and embodying my invention, traverses it about the pipe joint to prepare the welding gap at the pipe joint and then, after a predetermined travel, returns it from its cutting position to its retracted position. This control also starts and stops the welding operation at the beginning and end of the cut formed by the gap cutting means by initiating and stopping the electrode feed and the supply of welding current thereto as well as initiating and interrupting the supply of shielding gas to the welding zone during welding.

The welding head 15, as best shown in FIG. 2, is mounted on a tilt plate 32 which is pivotally supported on a mounting 33 which is adjustable crosswise of member 17 which in turn is supported on two of the shafts 14 of the rotatable frame comprising face plates 12 and 13 connected by all four of these shafts. The amount of tilt is controlled by an adjusting means 34 which positions dogs on tilt plate 32 relative to a boss on plate 33 which extends through an arcuate slot in plate 32. Preferably the head is tilted from a radial electrode feed position backward relative to the direction of welding. The welding head is spaced from the pipe joint by a roller 35 which shifts the welding head 15 lengthwise of plate 32 in accordance with the contour of the pipe on which it rests at a point adjacent to the joint between the pipe ends. The consumable electrode is fed from a supply reel in container 36, through a flexible conduit 37 to the feed rolls of welding head 15. The welding head has a nozzle through which a shielding gas is supplied to the welding zone.

Figure 3:
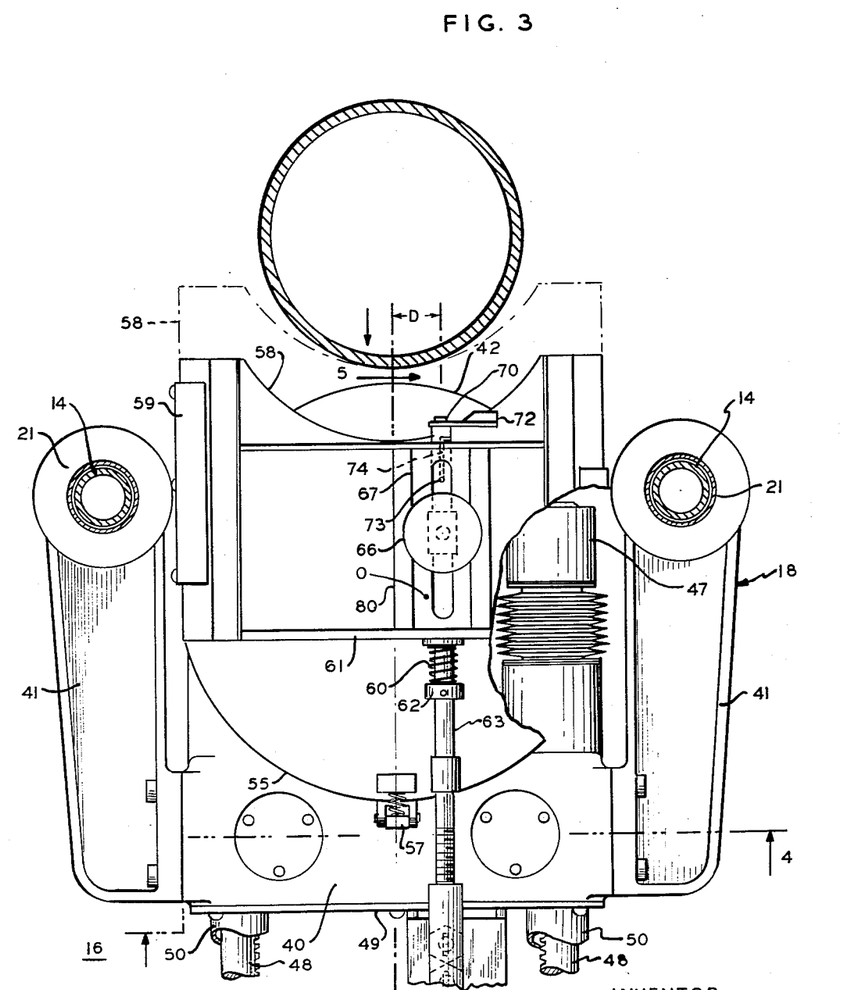
FIG. 3 is an enlarged side view of the cutting wheel assembly constituting the gap cutting means of this machine.
Figure 4:
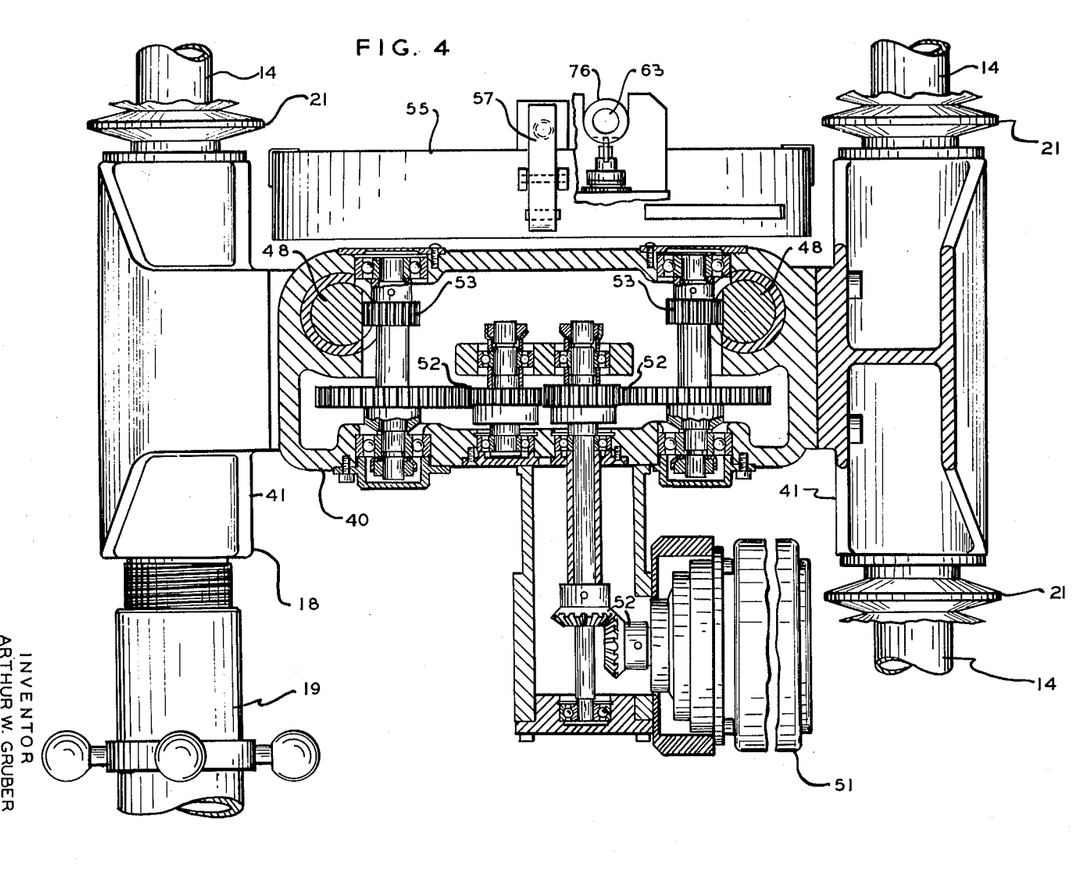
FIG. 4 is a sectional view of this cutting wheel assembly taken along the section line 4—4 of FIG. 3 as viewed in a downward direction relative thereto.
Figure 5:
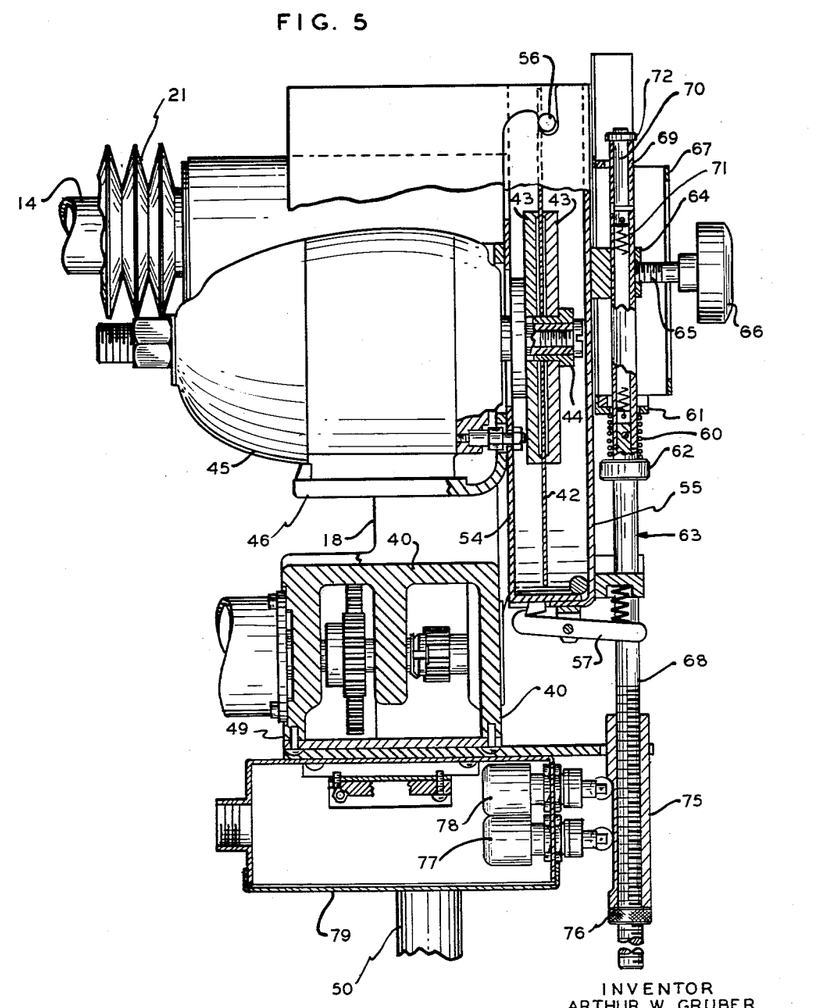
FIG. 5 is a sectional view to the left of section line 5—5 of FIG. 4, showing additional features of the cutting wheel assembly.

The structure of the gap cutting means 16 is shown in detail in FIGS. 3, 4 and 5. As best shown in FIG. 3 the support member 18 therefor is formed by a gear box 40, to the opposite ends of which one end of each of two arms 41 are bolted. The other ends of these arms terminate in hollow cylindrical members which enclose bearings slidaby mounted on two of the hollow shafts 14 of the rotating frame comprising face plates 12 and 13 connected by all four of these shafts.

The gap cutting means 16 comprises a cutting wheel 42 held by flange 43 for rotation with the shaft 44 of a drive motor 45. This motor is supported on the mid portion of a yoke member 46 having hollow cylindrical end portions 47 for fixedly holding the ends of round rod racks 48. These racks extend through cylindrical bosses forming part of the gear box 40, and are supported by bearings in these bosses for lengthwise sliding motions therein. These bearings and bosses have cut away portions which expose the gear teeth of these racks to the interior of the gear box. These racks extend through the gear box cover 49 and their projecting ends are enclosed in cylindrical portions 50 which project from the body portions of this cover.

The cutting wheel 42, its drive motor 45, and the support 46 for this motor is moved toward and away from the pipe joint, with the cutting-wheel axis moving in the plane designated by the line 80, by an electric motor 51 whose shaft is connected through a gear drive 52 which terminates in pinions 53 which engage the teeth of racks 48 and simultaneously move them in the same direction by the same amount relatively to the support member 18.

The cutting wheel which I have employed is a thin abrasive disc selected to provide fast cutting rates without the use of a coolant. The rotational speed of these discs is set to minimize breakage without sacrificing cutting speed. The discs are consumable in use and approximately 200 linear inches of pipe joint preparation is obtained with a disc before it must be discarded and replaced by a new disc.

The cutting wheel is located within a guard 54 having an interlocking cover 55 which is detachably hinged at 56 on guard 54 and held in place thereon by a latch 57 to form with the guard an enclosure which covers the cutting wheel except for a portion thereof which extends toward the joint in the pipe assembly. This enclosure is partly formed by a slide cover plate 58 held in place on the cover 55 by guides 59 attached to the cover. This slide cover plate is biased toward the pipe assembly by a spring 60 located between a rib 61 on the plate 58 and a collar 62 on the gauge bar 63 which is adjustably clamped in a boss 64 on cover 55 by a set screw 65 having a hand knob 66 by which it may be turned to clamp and release the attachment of gauge bar 63 with the cover 55 of the wheel guard. The end of the gauge bar is protected by a cover 67 which is attached to slide cover plate 58 and has a longitudinal slot therein through which the set screw 65 extends.

The outer end of gauge bar 63 is formed of a round rod 68 and its inner end is formed of a round tube 69 whose outer end fits over and is pin connected to a reduced inner end portion of rod 68 which projects into tube 69. The gauge bar also has at its inner end a part 70 which makes a telescopic engagement with the inner end of tubular part 69 into which it is biased by a spring 71 which is enclosed therein and has its ends connected to the near ends of rod 68 and part 70. The projecting end portion of part 70 has an arm or stud 72 extending laterally therefrom. The part 70 and its arm 72 is guided in the tubular end part of the gauge bar by a pin 73 which engages a slot 74 therein which extends longitudinally of the gauge bar for a predetermined distance where it terminates in a sidewise direction to provide a pin engaging shoulder for locking part 70 in its extended position when it is turned about its longitudinal axis to bring its arm 72 into a position to engage the periphery of the cutting wheel 42. When parts 70 and 72 are in their retracted position they will not interfere with the in feed of the cutting wheel by coming into engagement with the pipe assembly located in the machine.

The rod part 68 of the gauge bar 63 is threaded for adjustably positioning thereon a switch actuating sleeve 75 which makes a threaded engagement therewith. This sleeve is held in its adjusted position on gauge bar 63 by a lock nut 76 also threaded on part 68. This sleeve is provided with a flat side surface terminating in shoulders which engage and operate the in and out limit switches 77 and 78 by engaging rollers forming a part of their actuating mechanism. These limit switches control the operation of the cutting wheel positioning motor 51. They are mounted in the end of a switch box 79 which is supported on the cover for gear box 40 between the projections 50 thereof for the ends of the rack rods 48 which project through this gear box. Thus by an adjustment of the gauge bar 63 in dependence on the diameter of the cutting wheel, the in feed of motor 51 is arrested when sleeve 75 actuates limit switch 77. At the end of a cutting operation when the cutting wheel is to be returned to its retracted position by operation of one of the switches 31 of the main control, the out feed of motor 51 will be arrested when sleeve 75 actuates limit switch 78.

While the general operation of the machine as thus far described is probably apparent from the above description of its parts and their relationships to one another, it may here be briefly stated as follows:

The end portions of the two pipes are inserted in the machine and held therein by operating the clamps forming part of the machine. The pipe ends are brought into closer proximity with one another than the final gap width that is desired for the welding operation. The welding head and cutting wheel assembly are then positioned lengthwise of the pipe assembly over the joint between the pipes by aligning the cutting wheel of the cutting wheel assembly with the joint between the pipes by using the sighting means described as being associated with the cutting wheel assembly. Positioning of the cutting wheel assembly relative to the point between the pipes automatically positions the welding head relative thereto if the automatic synchronizer above described is employed. After this adjustment the machine is set in operation by starting the drive motor which propels the chain drives which impart rotation to the face plates of the rotatable frame on which the welding head and cutting wheel assembly are mounted. As previously stated one of the drive chains for one of the face plates operates control switches of a main control which determine the selective operation of the cutting wheel assembly and the welding head. The cutting and welding operations start at the top of the joint and end at the bottom thereof.

The main control initiates the in feed of the cutting wheel assembly to form the spacing cut between the pipe ends. The distance the cutting wheel assembly is fed into the pipe joint is determined by a previous adjustment of the gauge mechanism forming part of an auxiliary control for the cutting wheel assembly. Depending on the adjustment of this gauge mechanism which in turn depends on the size of the cutting wheel, the cutting wheel assembly is fed into the pipe joint the proper distance to initiate the cut therein at a predetermined point on the pipe joint. Thereafter the cutting wheel assembly is rotated, approximately half way around the pipe joint, to form the desired length of spacing gap between the pipe ends after which it is withdrawn from the joint to its retracted position. The welding head is then energized by the main control to start welding at the predetermined point on the pipe joint relative to the end of the cut formed therein by the cutting wheel assembly. Welding proceeds along the prepared gap to the end thereof when the welding action is interrupted by the main control. Thereafter the other side of the pipe is welded in the same manner and in the opposite direction which likewise proceeds from the top of the pipe to the bottom thereof.

Attention may now be directed to the gauge bar 63, which as seen in FIGURES 2, 3 and 5 is supported for endwise movement relative to the remainder of the cutting-wheel assembly—a movement which is permitted when the set-screw 65 is loosened by its knob 66. The gauge bar will be used, just prior to the making of a cut and while the cutting-wheel assembly is still in its retracted position, by drawing the gauge-bar rod 70 and the attached arm 72 outwardly from the gauge-bar tube 69 against the bias of the spring 71 until the pin 73 reaches the sidewise-directed or locking portion of the slot 74, then rotating the rod 70 to swing the arm 72 into overlying relationship to the cutting wheel 42, then (with screw 65 loosened by knob 66) drawing the gauge bar longitudinally away from the work until its arm 72 just touches the cutting-wheel periphery, then locking the gauge bar to the cutting-wheel support by tightening the screw 65, and finally rotating the rod 70 to swing the arm 72 away from the cutting wheel and thus to permit the re-telescoping or retraction of that rod into the tube 69. Such use or longitudinal positioning of the gauge bar will serve to measure a dimension in the apparatus which is a function of the cutting-wheel diameter. The nature of that function is hereinafter dealt with; that measurement may be considered to be represented by the separation, as projected perpendicularly onto the gauge-bar axis, between any selected point fixed in the cutting-wheel assembly (for example a point O, indicated in FIGURE 3, on the surface of the cover 67 in a plane through the cutting-wheel axis normal to the plane 80) and the point of contact of the extended-and-rotated arm 72 with the cutting-wheel periphery.

By an initial proper positioning of the sleeve 75 longitudinally of the gauge-bar rod 68 (following an initial use of the gauge bar as just described) the apparatus will have been adjusted so that the lower-shown or in-limit-switch-actuating shoulder on the sleeve 75 will actuate the in-limit switch 77 to stop the in-feed just when the in-feeding cutting-wheel assembly (at that time operating at a fixed angular position about the pipe joint) has brought the cutting wheel sufficiently into the work so that the cut extremity has reached a desired distance from and normal to the plane 80—for example the distance D indicated in FIGURE 3. (This extremity may be considered the starting extremity of the cut, since following the now-stopped in-feed the cutting-wheel assembly is to be rotated clockwise as viewed in this figure.) The lower-shown shoulder of the sleeve 75 and the associated in-limit switch 77 will be recognized as means which stops the workward movement of the cutting-wheel axis at a limiting position. Over and beyond the making of the measurement above described, it is a further function of the use of the gauge bar to variously establish the spacing of that limiting position from the work in accordance with the last such measurement—so that in the making of cuts at a series of positions on the work, and in spite of intervening wear or change of the cutting wheel operating to change its diameter, the starting extremity of each cut will occur at the same distance—e.g. D—from the plane 80 in which for that cut the axis of the cutting wheel is movable toward the work.

It will be observed that when the diameter of the cutting wheel has become reduced and the limiting position of the workward movement of the cutting-wheel axis thus required to be closer to the work, the measurement above-mentioned will have been reduced and the spacing of the lower-shown shoulder of the sleeve 75 from the point O thus increased, with the proper result that the limiting position for the in-feed of the cutting-wheel axis will have been moved closer to the work. It remains to be seen, however, that it will have been thus moved in correct degree.

Figure 6:
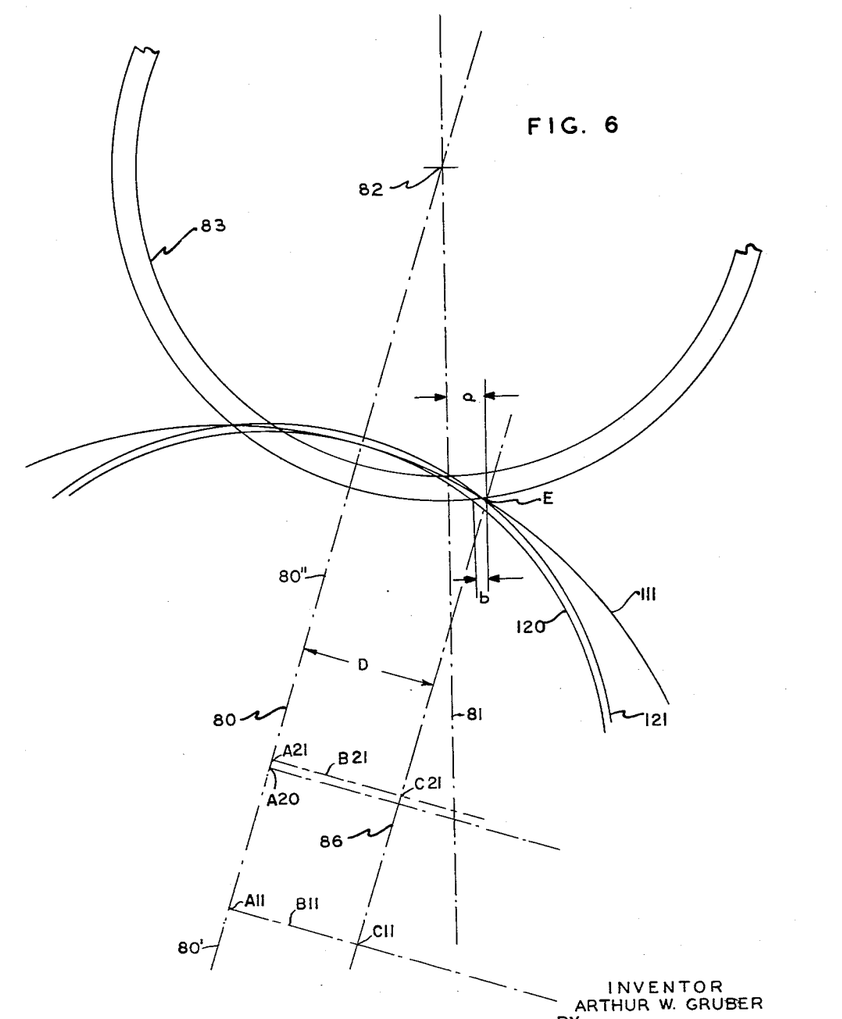
FIG. 6 is a diagram which illustrates the operating principle of the embodiment of my invention shown in the previously identified figures.

Reference is now conveniently had to the diagrammatic FIGURE 6, in which the line 81 indicates a plane (such as indicated by the corresponding line 81 in FIGURE 2) with regard to which the cutting-wheel assembly and arc-welding head are positioned through the operation of switches 31 by the chain drive which rotates them about the pipe joint. Therein the line 80 again indicates the pane or planar path in which the axis of the cutting wheel is movable toward the work; its lower portion 80' indicates the actual path of movement of that axis and its upper portion 80" indicates the extension of that path— which extension of course intersects the work, and has been specifically shown as passing through (and intersecting the plane 81 at) the center 82 of the pipe-joint section 83.

In FIGURE 6 the arc 111 indicates the initial periphery of an initial cutting wheel at its limiting workward position (its axis then lying at A11) wherein it makes in the pipe joint a cut having an extremity at the desired point E; this point may be at a desired distance "a" in back (on the basis of a later clockwise rotation of the cutting-wheel assembly and welding head about the pipe joint) of the plane 81, and is of course spaced from the plane 80 by the distance D normal to that plane, as abovementioned. Arc 120 indicates the periphery of a cutting wheel which has been partially consumed by wear and which has been fed toward the work so that it has made the same depth of cut into the work along the plane 80 as did the wheel represented by arc 111 along that plane, its axis then lying at A20. It will immediately be observed that the cut effected by the partially-consumed wheel has an extremity which falls short of the desired point E by a distance "b"; this indicates that were the measurement abovementioned to be made along the plane 80 (with the effect that it would be a measurement of radius or, more broadly, of a function varying arithmetically with radius), then the resulting spacing of the worn-cutting-wheel axis from the work would be too great and thus erroneous.

According to the invention any such error is avoided by measuring a dimension of the apparatus which, although immediately influenced by cutting-wheel radius, lies along a non-radial line of the cutting wheel—e.g. along a line which is parallel to the path of movement (plane 80) of the wheel axis and is spaced therefrom, in the direction in which the point E is spaced therefrom, by the distance D abovementioned. Such a line, which by definition passes through the point E, is shown as 86 in FIGURE 6. The measurement having been so made (of course, while the wheel was retracted) in the case of the initial wheel of which the in-fed peripheral position is indicated by arc 111, its magnitude (considered as taken to the point O in FIGURE 3, and when viewed in FIGURE 6) would have been equal to the separation between the point E and the point C11 which lies at the intersection of line 86 with that wheel diameter B11 which is normal to the path 80. Having been so made in the case of the worn wheel of which a peripheral position has been indicated by arc 120, its magnitude would have been reduced from that for the initial wheel by more than the difference in the wheel radii, so that the in-fed peripheral position of the worn wheel would in FIGURE 6 be higher than that of the arc 120, and would instead be that of the arc 121 which as desired passes through the point E— that magnitude when viewed in FIGURE 6 being equal to the separation between point E and the point C21 which lies at the intersection of line 86 with that diameter B21 which is normal to the path 80. The axis of the in-fed worn wheel would lie at A21.

It is in order that the arm 72 when in its extended-and-rotated position may be engaged with the cutting-wheel periphery at the distance D from the plane 80 that FIGURES 2 and 3 show the gauge bar 63 as offset (rightwardly as seen in those figures) from the plane 80.

Reference again being had to FIGURE 6, it will be recognized that of the initial cutting wheel the measured separation (i.e. that between points E and C11 as seen in this figure) may be defined as the half-length of a chord of the wheel which is distant from the wheel axis by the distance D, and likewise that of the worn cutting wheel the measured separation (i.e., that between points E and C21 as seen in this figure) may be identically defined.

In the preceding paragraphs the measurements have been stated, for explanatory conveniences, as being of a dimension terminating at a point corresponding to O of FIGURE 3. It is to be understood that the measured dimension need not actually terminate at that point, it being necessary only that it be one which varies arithmetically with one so terminating.

The gauge mechanism need not have a rectilinear path of travel parallel to a rectilinear path of travel of the cutting wheel assembly as shown in the drawings so long as it provides means movable along a path of travel parallel to the path of travel of the cutting-wheel axis for effectively measuring the cutting wheel at a point on its periphery which is aligned relative to its said path of travel with a point on the workpiece where it is intended that the cutting wheel intersect the workpiece to initiate a cut thereon.

It is, of course, obvious that my invention for controlling the in and out feed of a cutting wheel is not limited to the use of the particular gauge bar mechanism above illustrated and described. Other arrangements may be employed so long as the cutting wheel measurement is obtained at a point thereon directly opposite the point on the workpiece where the cut is to be initiated or at an angular position thereon corresponding in angular position with the angular position relative to the center line of movement of the cutting wheel where it is intended that its periphery intersect the workpiece and initiate the cut.

Thus the cutting wheel measurement may be obtained at a point on its periphery which is diametrically opposite the point thereon which is directly opposite the point on the workpiece where the cut is to be initiated. In one such arrangement parallel and equal linear movements of rack bars may be employed for respectively measuring the size of the cutting wheel and for positioning a stop which engages a pipe section to limit the in feed of the cutting wheel assembly. These bars would be spaced equal distances from and on opposite sides of the cutting wheel spindle for travel along paths parallel to the center line of movement of the cutting wheel assembly and the stop rack bar would be positioned to engage a pipe section along an element thereof which is aligned with the desired point of cut initiation when a retractable element on the measuring rack bar is moved into engagement with the periphery of the cutting wheel. This retractable element would be movable from a biased position on this rack bar which is spaced from the cutting wheel to a position in which it will engage the periphery of the cutting wheel. After making this adjustment the retractable member of the measuring rack bar would be released to return to its biased position away from the cutting wheel and the resulting adjustment of the stop rack bar would then serve to limit the in feed of the cutting wheel assembly which could be in response to the operation of a suitable motor mechanism.

As previously pointed out the end location of the cuts will be maintained constant in successive workpieces if the chord subtending the cutting arc of the cutting wheel is maintained constant by feeding the cutting wheel along its center line of movement by an amount which will accomplish this result. Thus the gauge bar may be provided with members which are brought into engagement with the periphery of the cutting wheel and which are spaced from one another by this chordal distance. Also only one such member at one end of this chord measuring arrangement may be used but it is preferable to use the two member arrangement to obtain a more certain measurement since a single member may engage a nick in the cutting wheel and thus provide a false measurement of the effective size of the cutting wheel.

Obviously my invention is not limited to forming cuts on circular workpieces such as between pipe ends for which the above described machine is particularly suited. Furthermore variations may be made in the arrangement of parts including the gauge mechanism without departing from the operating principle of my invention.

In view of the above description of the embodiment of my invention shown in the drawings other embodiments thereof will occur to those skilled in the art and I therefore intend to cover by the appended claims all such modifications of my invention as fall within the true spirit and scope thereof.

What I claim as new and desire to secure by Letters Patent of the United States is:

1. In the use on work of apparatus, the apparatus and the work occupying successive relative positions and the apparatus including a cutting wheel subject to peripheral wear and having an axis about which it is rotated and which is relatively movable toward and away from the work in a path which when extended intersects the work, for the making in the work of a succession of cuts of each of which an extremity is to be spaced from the extension of said path by a predetermined distance normal to that path extension and in a given direction therefrom, the method of wheel control which comprises restricting to a limiting position spaced from the work workward movement of said axis, making sequential measurements of a dimension of the apparatus which is immediately influenced by wheel radius and which lies on a line on the wheel parallel to said path and spaced therefrom by said predetermined distance in said given direction, and establishing the spacing of said limiting position from the work along said path extension in accordance with the last such measurement.

2. In the use on work of apparatus, the apparatus and the work occupying successive relative positions and the apparatus including a cutting wheel subject to peripheral wear and having an axis about which it is rotated and which is relatively movable toward and away from the work in a path which when extended intersects the work, for the making in the work of a succession of cuts of each of which an extremity is to be spaced from the extension of said path by a predetermined distance normal to that path extension and in a given direction therefrom, the method of wheel control which comprises restricting to a limiting position spaced from the work workward movement of said axis, making sequential measurements of a dimension of the apparatus which varies arithmetically with the separation between the intersections of the wheel periphery and of that wheel diameter which is normal to said path with a line on the wheel parallel to said path and spaced therefrom by said predetermined distance in said given direction, and establishing the spacing of said limiting position from the work along said path extension in accordance with the last such measurement.

3. In the use on work of apparatus, the apparatus and the work occupying successive relative positions and the apparatus including a cutting wheel subject to peripheral wear and having an axis about which it is rotated and which is relatively movable toward and away from the work in a path which when extended intersects the work, for the making in the work of a succession of cuts of each of which an extremity is to be spaced from the extension of said path by a predetermined distance normal to that path extension, the method of wheel control which comprises restricting to a limiting position spaced from the work workward movement of said axis, making sequential measurements of a dimension of the apparatus which varies arithmetically with the half-length of a chord of the wheel which is distant from said axis by said predetermined distance, and establishing the spacing of said limiting position from the work along said path extension in accordance with the last such measurement.

4. Apparatus for use on work, the apparatus and the work occupying successive relative positions and the apparatus including a cutting wheel subject to peripheral wear and having an axis about which it is arranged for rotation and which is relatively movable toward and away from the work in a path which when extended intersects the work, for the making in the work of a succession of cuts of each of which an extremity is to be spaced from the extension of said path by a predetermined distance normal to that path extension and in a given direction therefrom, comprising, in combination with the wheel, means for restricting to a limiting position spaced from the work workward movement of said axis, means for making sequential measurements of a dimension of the apparatus which is immediately influenced by wheel radius and which lies on a line on the wheel parallel to said path and spaced therefrom by said predetermined distance in said given direction, and means controlled by said last-recited means for establishing the spacing of said limiting position from the work along said path extension in accordance with the last such measurement.

5. The subject matter claimed in claim 4 in combination with means for moving said axis into said limiting position and means for moving said axis while in said limiting position along the surface of the work.

6. The subject matter claimed in claim 4 wherein said measurement-making means comprises a gauge bar extending along said line and longitudinally movable therealong to vary its relationship to said axis.

7. The subject matter claimed in claim 6 further including means for clamping said gauge bar in position fixed with relation to said axis.

8. The subject matter claimed in claim 6 wherein said gauge bar is spaced from, but includes a portion movable into engagement with the periphery of, said wheel.

9. The subject matter claimed in claim 8 wherein said gauge-bar portion, when the gauge bar is not in use in the act of measuring, is longitudinally retractable.

10. Apparatus for use on work, the apparatus and the work occupying successive relative positions and the apparatus including a cutting wheel subject to peripheral wear and having an axis about which it is arranged for rotation and which is relatively movable toward and away from the work in a path which when extended intersects the work, for making in the work a succession of cuts of each of which an extremity is to be spaced from the extension of said path by a predetermined distance normal to that path extension and in a given direction therefrom, comprising, in combination with the wheel, means for restricting to a limiting position spaced from the work workward movement of said axis, means for making sequential measurements of a dimension of the apparatus which varies arithmetically with the separation between the intersections of the wheel periphery and of that wheel diameter which is normal to said path with a line on the wheel parallel to said path and spaced therefrom by said predetermined distance in said given direction, and means controlled by said last-recited means for establishing the spacing of said limiting position from the work along said path extension in accordance with the last such measurement.

11. The subject matter claimed in claim 10 in combination with means for moving said axis into said limiting position and means for moving said axis while in said limiting position along the surface of the work.

12. Apparatus for use on work, the apparatus and the work occupying successive relative positions and the apparatus including a cutting wheel subject to peripheral wear and having an axis about which it is arranged for rotation and which is relatively movable toward and away from the work in a path which when extended intersects the work, for the making in the work of a succession of cuts of each of which an extremity is to be spaced from the extension of said path by a predetermined distance normal to that path extension, comprising, in combination with the wheel, means for restricting to a limiting position spaced from the work workward movement of said axis, means for making sequential measurements of a dimension of the apparatus which varies arithmetically with the half-length of a chord of the wheel which is distant from said axis by said predetermined distance, and means controlled by said last-recited means for establishing the spacing of said limiting position from the work along said path extension in accordance with the last such measurement.

13. The subject matter claimed in claim 12 in combination with means for moving said axis into said limiting position and means for moving said axis while in said limiting position along the surface of the work.

References Cited in the file of this patent

UNITED STATES PATENTS

| | | |
|---|---|---|
| 1,175,197 | Thomas | Mar. 14, 1916 |
| 2,040,364 | Dean | May 12, 1936 |
| 2,477,587 | Doutt | Aug. 2, 1949 |
| 2,513,075 | Youngstrand | June 27, 1950 |